United States Patent
Sohn

(10) Patent No.: US 10,274,318 B1
(45) Date of Patent: Apr. 30, 2019

(54) NINE-AXIS QUATERNION SENSOR FUSION USING MODIFIED KALMAN FILTER

(71) Applicant: Amazon Technologies, Inc., Seattle, WA (US)

(72) Inventor: Jung Bae Sohn, Sunnyvale, CA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 854 days.

(21) Appl. No.: 14/502,174

(22) Filed: Sep. 30, 2014

(51) Int. Cl.
  G01C 21/16 (2006.01)
  G01C 19/02 (2006.01)
  G01C 21/08 (2006.01)
  G01P 15/18 (2013.01)
  G06F 3/01 (2006.01)

(52) U.S. Cl.
  CPC ............. *G01C 19/02* (2013.01); *G01C 21/08* (2013.01); *G01P 15/18* (2013.01); *G06F 3/017* (2013.01)

(58) Field of Classification Search
  USPC .......................................................... 702/150
  See application file for complete search history.

(56) References Cited

U.S. PATENT DOCUMENTS

| 2005/0240347 A1* | 10/2005 | Yang | G01C 21/16 701/500 |
| 2006/0041361 A1* | 2/2006 | Matrosov | E02F 3/842 701/50 |
| 2013/0185018 A1* | 7/2013 | Sheng | G01B 7/00 702/153 |
| 2014/0316698 A1* | 10/2014 | Roumeliotis | G01C 21/165 701/500 |

OTHER PUBLICATIONS

Grubin. Derivation of the Quaternion Scheme via the Euler Axis and Angle. Journal of Spacecraft and Rockets. vol. 7, No. 10, pp. 1261-1263, 1970.
Grubin. Quaternion Singularity Revisited. Journal of Guidance, Control, and Dynamics. vol. 2, No. 3, pp. 255-256, 1979.
Jenson. Generalized Nonlinear Complementary Attitude Filter. Journal of Guidance, Control, and Dynamics. vol. 34, No. 5, pp. 1588-1593, 2011.
Klumpp. Singularity-Free Extraction of a Quaternion From a Direction-Cosine Matrix. Journal of Spacecraft and Rockets. vol. 13, No. 12, pp. 754-755, 1976.
Madgwick. An Efficient Orientation Filter for Inertial and Inertial/Magnetic Sensor Arrays. Report x-io and University of Bristol (UK), 2010.

(Continued)

*Primary Examiner* — Mohamed Charioui
(74) *Attorney, Agent, or Firm* — Pierce Atwood LLP

(57) ABSTRACT

A system for determining and correcting a calculated orientation of a computing device based on data from an accelerometer and a gyroscope. The system utilizes a modified Kalman filter that updates covariance to reduce decay over time based on a residual of the filter. Gyroscope bias is tracked and offset based on the updated covariance and the residual. The residual is based on an observational orientation determined from an angle between a measured acceleration vector and an expected acceleration vector, rotating a predicted frame based on the angle.

19 Claims, 9 Drawing Sheets

(56) References Cited

OTHER PUBLICATIONS

Mahony, et al. Nonlinear Complementary Filters on the Special Orthogonal Group. Automatic Control, IEEE Transactions. vol. 53, No. 5, pp. 1203-1218, 2008.
Miller. On the Inverse of the Sum of Matrices. Mathematics Magazine. pp. 67-72, 1981.
Rodriguez. Kalman Filtering, Smoothing, and Recursive Robot Arm Forward and Inverse Dynamics. Jet Propulsion Laboratory. Dec. 1, 1986.

* cited by examiner

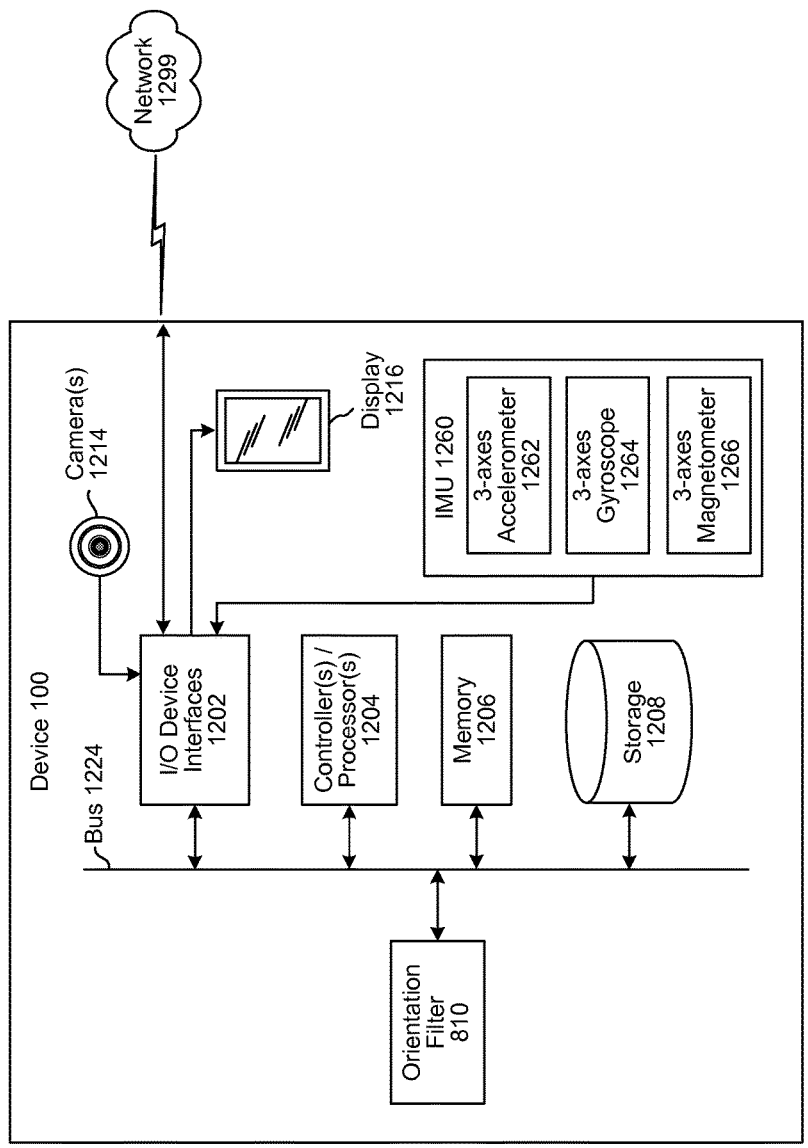

NINE-AXIS QUATERNION SENSOR FUSION USING MODIFIED KALMAN FILTER

BACKGROUND

Handheld and wearable electronic devices regularly include navigation capability and often include features to determine device orientation or other internal sensors. Some devices have multiple radios, including WiFi and Bluetooth. Many also provide a graphical user interface (GUI) and touch screen via which the user may interact with the GUI.

BRIEF DESCRIPTION OF DRAWINGS

For a more complete understanding of the present disclosure, reference is now made to the following description taken in conjunction with the accompanying drawings. All angles described herein are in radians unless otherwise stated.

FIG. 12 is a block diagram conceptually illustrating example components of device of the system of FIG. 1.

DETAILED DESCRIPTION

Figure 1:
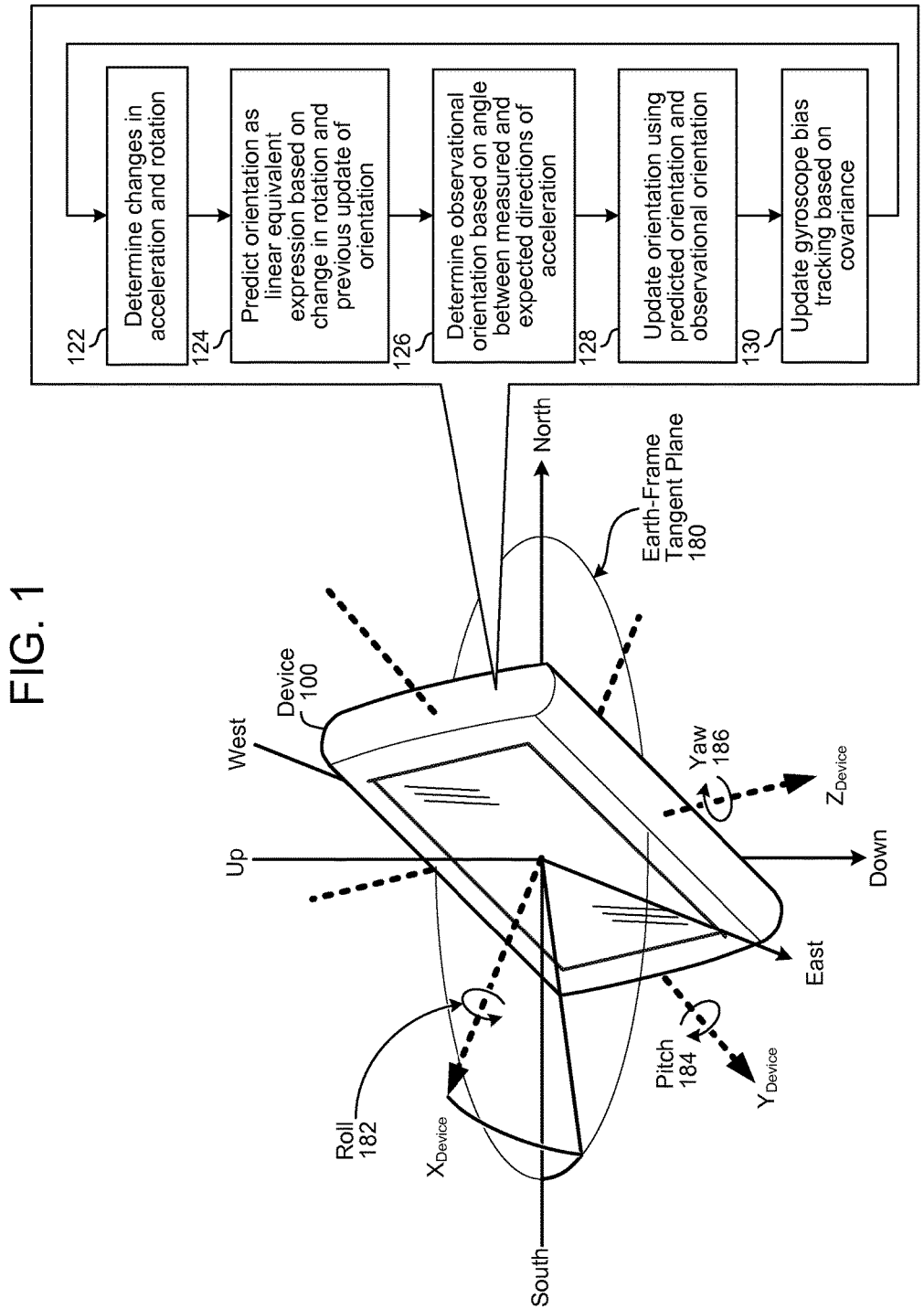
FIG. 1 illustrates a system for correcting an estimation of device orientation.

Certain computing devices may be configured with user interfaces and/or software applications controlled in part by changes in device orientation and inertial motion. It is important with such devices to carefully track changes in the device's motion so that the user interface (UI) and/or software application that depends on the motion operates properly. Such devices may include an IMU (Inertial Measurement Unit) to detect changes in motion.

In contemporary devices, an IMU typically includes a three-axis gyroscope to measure rotational movement, a three-axis accelerometer to measure acceleration, and a three-axis magnetometer to provide compass direction. With the exception of the direction of gravity which acts as a downward acceleration on the device and can be measured by the accelerometer, an IMU by itself only has the magnetometer data to determine how the device's reference frame relates to an "absolute" reference frame such as an Earth coordinate-based reference frame.

North East Down (NED), also known as local tangent plane (LTP), is a geographical coordinate system in an Earth reference frame that is commonly used in aviation, and may be used with IMU. If the direction of an Earth field such as gravity and/or magnetic North is known in the Earth reference frame, a measurement of that same field within the device's sensor frame (x, y, z) will allow a device to determine the orientation of its sensor frame relative to the Earth reference frame, and likewise, the orientation of the Earth reference frame relative to the sensor frame.

However, even if the direction of gravity and magnetic North are measured by a device's sensors, the measured direction of gravity may be inaccurate due to device acceleration, data from magnetometers may contain a high level of noise, and magnetometers are susceptible to spurious magnetic fields and distortions, corrupting a device's estimate of its own external heading and orientation. As a result, a device's estimate of its own orientation may become decoupled from the external reference frame. Over time, this results in inaccurate orientation estimates, as drift errors in the gyroscopes and accelerometers accumulate over time.

Various techniques have been developed to compensate for drift and accumulated errors, and to link a device's predicted orientation based on inertial measurements to an external reference frame. However, although the actual rotation mechanics of the system are non-linear, these techniques rely on assumptions that the variables are linear. For example, some predictive algorithms use brute-force linearization, such as using an extended Kalman filter (EKF), which is a version of the Kalman filter that linearizes non-linear data based on an estimate of the current orientation and "covariance" (error/accuracy uncertainty). Other predictive algorithms formulate different, indirect state variables to estimate the non-linear system as linear (e.g., employing an Indirect Kalman filter).

Kalman filters are algorithms that use a series of measurements over time that contain random variations (e.g., noise) and other inaccuracies, and produce an estimate of unknown variables that tend to be more precise than those based on a single measurement alone. Kalman filters are widely used in "orientation filters," which are the filters in devices that handle the task of integrating the data from the accelerometers, gyroscopes, magnetometers, etc., to provide a single estimate of device orientation. This integration task is sometimes referred to as "sensor fusion."

In an orientation filter, if there is a difference between the device's "predicted" inertial reference frame and the "observed" external reference frame (e.g., North, East, down) due to drift, error, etc., the orientation filter adjusts the predicted frame to correct the error. How these corrections are made is what distinguishes one orientation filter algorithm from another.

A Kalman filter uses a dynamic model to estimate as system's "state" based on the physical laws of motion and multiple sequential measurements from the IMU sensors. This process can be characterized as comprising a "prediction" stage and an "update" stage. In the "prediction" stage, the Kalman filter produces estimates of the current state variables (e.g., predicted orientation), along with their uncertainties (e.g., the predicted covariance). After the outcome of the next measurement from the IMU is "observed," these estimates are updated in a "measurement update" stage. The Kalman filter averages a prediction of a system's state (e.g., orientation) with a new measurement using the weighted average, with more weight being given to estimates with higher certainty. The updated estimates are then used to produce new estimates in a repeating process.

All measurements and calculations based on models are estimates to some degree. The purpose of the weights is that values with smaller estimated uncertainty are "trusted" more. The weights are calculated from the "covariance," which is a measure of the estimated uncertainty of the prediction of the system's state. A large covariance corresponds to greater uncertainty about the prediction, whereas a smaller covariance corresponds to greater certainty that the prediction is accurate. The result of the weighted average is a new state estimate that lies between the predicted and measured state, and has a better estimated uncertainty than either alone.

This process is repeated over time, with the new estimate and the estimate's covariance informing the predictions used in the following iteration. This means that the Kalman filter works recursively and requires only the last "best guess," rather than the entire history, of a system's state to calculate a new state. Specifically, a Kalman filter can update its estimates with only motion data from the IMU, the previously calculated state (i.e., orientation) and the previously calculated covariance. The existing orientation prediction and correction approaches typically require a large state space, generating large matrices to model the system. Large matrices become computational costly when the matrices are inverted during Kalman filter calculations, increasing process latency and device power consumption. There is also a danger of numeric instability because forced linearization of non-linear variables can accumulate errors that will cause predictions to diverge from reality. Thus, a challenge in fusing sensor data from an IMU to effectively predict a device's orientation is to reformulate the non-linear mechanics of the system into a Kalman-filter friendly formulation without introducing mathematical instability.

FIG. 1 illustrates a device 100 employing an improved orientation filter that reformulates the non-linear physics into equivalent linear expressions, utilizing a modified Kalman filter to correct the device's calculation of its own predicted orientation. The Earth coordinate-based reference frame ("Earth reference frame") is illustrated by North, East, and down axes and the Cartesian device sensor frame is illustrated as x, y, and z axes. The North and East axes form the Earth-frame tangent plane 180, and the down axis is perpendicular to the tangent plane 180. The Earth-frame tangent plane 180 is approximately parallel to flat, level ground The reference frame axes and/or the sensor frame axes may be expressed as unit vectors. An ordinary vector conveys both a direction and a magnitude. By definition, a unit vector has a unit-less magnitude equal to one, such that it only conveys direction.

During operation, the device 100 predicts its own orientation relative to the reference/Earth reference frame, and predicts the orientation of the reference/Earth reference frame, based on changes detected by the IMU (e.g., roll 182, pitch 184, and yaw 186). Errors occur if the estimate of the current state of the reference frame is incorrect (e.g., the device's estimate of North has drifted from actual North), and if the device's predicted orientation within the predicted reference frame is inaccurate.

Orientation filters commonly use gyroscope data as the primary data source (i.e., as the mathematical integrator over time), and use data from the accelerometers and magnetometers for orientation correction. Gyroscope data is accurate in the short-term and ideal for near-instantaneous updates, whereas the accelerometer data is noisy in the short-term, but with filtering, stable in the long-term. Magnetometer data is also noisy in the short-term, and tends to be more susceptible to corruption than accelerometer data. Orientation filters commonly give the accelerometer data and magnetometer data equal or near-equal weight. The improved orientation filter separates accelerometer data and magnetometer data. The accelerometer data is likely to be more accurate than the magnetometer data, and therefore greater weight may be assigned to the accelerometer data than the magnetometer data.

The improved orientation filter of the device 100 is a modified Kalman filter. The device 100 determines (122) changes in acceleration and rotation using a three-axis gyroscope and a three-axis accelerometer. This data is a basis for the filter's "observation." Data from a three-axis magnetometer may also be used.

As part of the prediction stage of the modified Kalman filter, a predicted orientation is determined (124) based on the rotational data from the gyroscope and an updated corrected orientation from a previous iteration. The prediction stage may run until there is an "observation" from the IMU, with the prediction stage advancing the state variables until the next scheduled observation. A predicted covariance (statistical uncertainty) is also determined. The predicted orientation and covariance are both calculated using a linear equivalent expression for state propagation that avoids the use of complex "Jacobian" matrix calculations conventionally used to linearize the non-linear gyroscope data. The linear equivalent expression used by the modified filter accomplishes the same task as a Jacobian-based approach, but with significantly less computational complexity, and avoids the brute-force linearization, retaining the "subtleties" in the non-linear data that may be lost using conventional linearization techniques.

The orientation filter also determines (126) an "observational" orientation based on an angle $\theta_a$ between a measured direction of device acceleration and an expected direction of device acceleration. Gyroscope data is not verifiable in a conventional sense based on measured reality, as the orientation filter is dependent upon the IMU's gyroscopes to determine how the device pivots. Verification comes from predicting what the device's orientation in reality should be and comparing that prediction to the measured "real" North, East, and down "observational" frame using accelerometer and/or magnetometer data. For example, after a rotation of the device is measured using gyroscope data, a prediction may be made as to which direction the "down" vector is expected to be in, and which directions the "North" and "East" vectors are expected to be in.

The measured direction used to determine the "observational" orientation is based on the accelerometer data, and the "expected" direction of acceleration is based on the updated corrected orientation from the previous iteration. A vector cross product is taken of the measured and expected directions, and the frame orientation that is "expected" is rotated around the cross-product by the angle $\theta_a$. The angle $\theta_a$ is estimated based on cross-product. The resulting rotated frame provides the "observational" orientation in "body" frame ($X_{Device}$, $Y_{Device}$, $Z_{Device}$ in FIG. 1) relative to Earth reference frame (e.g., North, East, Down). This method of deriving an accelerometer's "observation" of orientation, rather than using observation in the pure, measured body frame, avoids the need to translate the body frame using non-linear techniques into an expression of orientation relative to Earth reference frame, since the instantaneous measurement of Earth reference frame may itself be in error.

Determination of the predicted orientation (124) based on gyroscope data and the observational orientation (126) based on accelerometer data may be performed in a different order than illustrated, such as in the opposite order or in parallel, as neither calculation is directly dependent upon the other.

Based on the predicted orientation (124) and observational orientation (126), the orientation filter "updates" (128) the corrected orientation and covariance estimates of the device. Because the certainty of the measurements is often difficult to measure precisely, it is common to discuss the filter's operations during updates in terms of a "gain." The Kalman "gain" is a function of the relative certainty of the measurements and current state estimate, and can be "tuned" to achieve particular performance. With a high gain, the filter places more weight on the measurements, and thus follows them more closely. With a low gain, the filter follows the model predictions more closely, smoothing out noise but decreasing the responsiveness. At the extremes, a gain of one causes the filter to ignore the state estimate entirely, while a gain of zero causes the measurements to be ignored.

The updated corrected orientation and covariance estimates are passed forward as the "result" to the next iteration, and the updated orientation may be output to the user interface (UI) and/or software applications making use of device motion. The update stage of the device 100 departs from convention in at least three significant way, as will be discussed further below. First, an approximation of the Kalman filter's "gain" may be used to reduce computational complexity with little-to-no impact on accuracy. Second, an adjustment is also made to the way that the updated "covariance" uncertainty value is calculated so that the covariance carried forward by the Kalman filter reduces system instabilities that occur over time in conventional filters. Specifically, this adjustment to the covariance adaptively moderates the normal reduction in the weight given to each accelerometer-based update from one iteration to the next, making the filter more robust. Third, the update stage updates (130) gyroscope bias tracking based on the updated covariance without requiring any prior information.

Gyroscope bias, or bias error, corresponds to the signal output from the gyroscope when the device is not experiencing any rotation. Gyroscopes have error sources and bias is one of these errors. Bias error tends to vary, both with temperature and over time. The term "bias drift" refers specifically to the variation of the bias over time, assuming all other factors remain constant. The rotational rates based on the output from each of the three gyroscopes (x, y, and z axes) includes bias. The update stage of the improved filter tracks this bias from one iteration to the next, adjusting bias "offsets" for the next iteration, compensating to reduce bias in the gyroscope rotational rate data.

Among the advantages of the modified Kalman filter is the filter's ability to produce accurate orientation estimates from noisy and inaccurate data. In particular, the accuracy of the filter's predictions depends on whether the orientation filter previously had the directions of the real world "Earth" frame correct, whether the newly updated measurements of the real world Earth reference frame are accurate (e.g., whether the accelerometer and/or magnetometer data are accurate), whether the orientation filter's previously had correctly calculated the device's own orientation relative to Earth reference frame (e.g., the orientation of the device's x, y, and z axes relative to the North, East, down Earth reference frame), and whether the rotational rate data from the gyroscopes is complete and accurate. Even with multiple errors in the data, the filter rapidly converges on the device's actual orientation, which itself may itself may be undergoing rapid, non-linear changes in motion.

As an explanatory starting point on how the improved orientation filter operates, when performing, the state estimate and covariances are encoded as matrices. Matrices are rectangular arrays of values arranged in rows and/or columns. Using matrices streamlines handling of the multiple dimensions involved in a single set of calculations. Matrices also simplify representation of linear relationships between different state variables (such as rotational rate data, acceleration data, orientation frames, and covariances).

Figure 2:
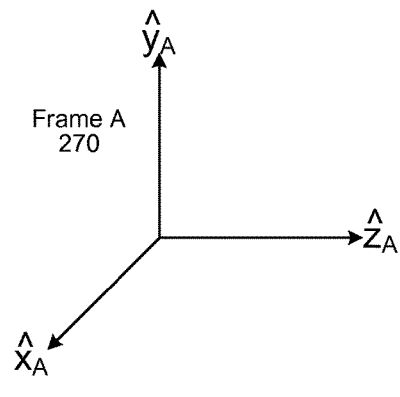
FIGS. 2 and 3 illustrate reference frames.
Figure 3:
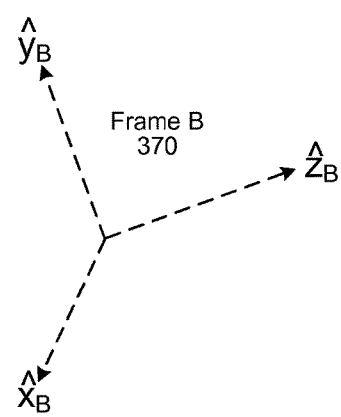

A change in orientation of the device 100 can be represented by a mathematical expression called a "quaternion." A quaternion is a four-dimensional complex number that can be used to represent the orientation of a rigid body or coordinate frame in three-dimensional space. The four-dimensional complex number can be represented as a matrix comprising one column and four rows, or four columns and one row. In inertial filter mathematics, quaternions are used to express the relative orientation of frames, such as the difference between a device's "body" frame and Earth reference frame (e.g., North, East, down). FIG. 2 illustrates a reference frame A 270 and FIG. 3 illustrates a reference frame B 370. The caret symbol "^" over each of the axes conveys that each of the axes is a unit vector (i.e., has a magnitude of one). The axes in a frame are mutually orthogonal, as is conventional for a Cartesian system. As illustrated, the orientations of frame A and frame B are different.

Figure 4:
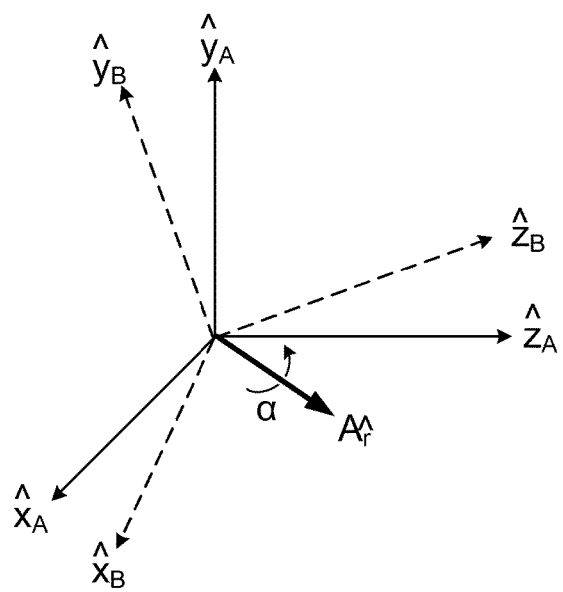
FIG. 4 illustrates how a quaternion can be used to express the difference in frames.

A quaternion can be used to express the difference in orientations between these two reference frames in terms of how one frame must be rotated to align its axes with those of the other frame. An example is illustrated in FIG. 4. The orientation of frame B can be achieved by a rotation, from alignment with frame A, of an angle α around axis $A_{\hat{r}}$. This may be expressed by the following quaternion $_{B}^{A}\hat{q}$ in equation [1], which describes the orientation of frame B relative to frame A, where $A_{\hat{r}}$ is a unit vector described in frame A:

$$_{B}^{A}\hat{q} = [\, q_1 \quad q_2 \quad q_3 \quad q_4 \,] = [\, \cos\frac{\alpha}{2} \quad -r_x\sin\frac{\alpha}{2} \quad -r_y\sin\frac{\alpha}{2} \quad -r_z\sin\frac{\alpha}{2} \,] \quad [1]$$

The components $r_x$, $r_y$, and $r_z$ define the direction of the unit vector $A_{\hat{r}}$ relative to the x, y, and z axes of frame A.

The quaternion conjugate, which is denoted by an asterisks symbol "*", can be used to swap the relative frames described by an orientation. For example, $_{A}^{B}\hat{q}$ is the conjugate of $_{B}^{A}\hat{q}$ and describes the orientation of frame A relative to frame B. The conjugate $_{B}^{A}\hat{q}$ is defined by equation [2] as follows:

$$_{B}^{A}\hat{q}^{*} = {_{A}^{B}\hat{q}} = [\, q_1 \quad -q_2 \quad -q_3 \quad -q_4 \,] \quad [2]$$

The quaternion product, denoted by ⊗, can be used to define compound orientations. For example, for two orientations described by $_{B}^{A}\hat{q}$ and $_{C}^{B}\hat{q}$, the compounded orientation $_{C}^{A}\hat{q}$ can be defined by equation [3] as follows:

$$_{C}^{A}\hat{q} = {_{C}^{B}\hat{q}} \otimes {_{B}^{A}\hat{q}} \quad [3]$$

For two quaternions, a and b, the quaternion product can be determined as defined in equation [4]:

$$a \otimes b = [\, a_1 \quad a_2 \quad a_3 \quad a_4 \,] \otimes [\, b_1 \quad b_2 \quad b_3 \quad b_4 \,] = \begin{bmatrix} a_1b_1 - a_2b_2 - a_3b_3 - a_4b_4 \\ a_1b_2 + a_2b_1 + a_3b_4 - a_4b_3 \\ a_1b_3 - a_2b_4 + a_3b_1 + a_4b_2 \\ a_1b_4 + a_2b_3 - a_3b_2 + a_4b_1 \end{bmatrix}^T \quad [4]$$

The superscript "T" indicates a transpose of the matrix, pivoting the matrix of one column and four rows to be a matrix of four columns and one row. A quaternion product is not commutative, such that a⊗b is not equal to b⊗a.

A three dimensional vector can be rotated by a quaternion using the relationship described in equation [5]. The vectors $A_v$ and $B_v$ are the same vector described in frame A and frame B respectively, where each vector contains a zero inserted as the first element to make them four element row vectors, with the second, third, and fourth elements providing the x, y, and z directions.

$$B_v = {}^A_B\hat{q} \otimes A_v \otimes {}^A_B\hat{q}^* \quad [5]$$

Further background discussion of quaternion mathematics is presented by Sebastian O. H. Madgwick in "An efficient orientation filter for inertial and inertial/magnetic sensor arrays," published by the University of Bristol in 2010, which is incorporated herein by reference.

In the discussion of Kalman filter, predictions from the prediction stage may be referred to as "a priori," and updates from the update stage may be referred to as "a posteriori." "A priori" is a Latin term that literally means "from the former," and "a posteriori" is a Latin term that literally means "from the latter."

As introduced in the discussion of FIG. 1, the modified Kalman-filter of the system 100 derives a Jacobian-free linear equivalent expression for state propagation by adapting a non-linear angular rate $_E^s\dot{q}$ derivation into a system propagation matrix "A," where "s" is the sensor coordinate frame and "E" is the Earth coordinate reference frame. This avoids brute force linearization and results in a matrix having a small state space. As another improvement, the "mapping" of the accelerometer-derived sensor observation to a quaternion is accomplished using axis-angle and a cross-product operations, simplifying the observation dynamics to an "identity matrix" (i.e., a matrix with values of one along a diagonal, otherwise filled with zeros), avoiding use of Jacobians to form the identity matrix. As a further improvement, the covariance (uncertainty) is updated with a combination of traditional Kalman gain and based on a "residual" (error) magnitude. As a result, a high error (i.e., a large residual ỹ) leads to a high predicted covariance estimate, affecting how aggressively the filter makes accelerometer-based corrections. As a further improvement, the new covariance and residual are used to actively track sensor bias without prior information. The covariance provides an active indicator of how much correction "effort" is needed on each gyroscope bias correction, and the residual determines the discrepancy between the predicted measurement and the actual measurement. As a result, there is no need for extra state variables for bias tracking.

A "sensor frame" or "body frame" refers to the relative orientation of the x, y, and z axes based on sensor data, as shown, for example, in FIG. 1. A quaternion expressing a rotation of an Earth reference frame "E" (e.g., North, East, down) with respect to a measured inertial device sensor frame "s" (e.g., based on IMU data) is expressed in equation [6]:

$$_E^S\hat{q} \triangleq \begin{bmatrix} q_1 \\ q_2 \\ q_3 \\ q_4 \end{bmatrix} \quad [6]$$

The sensor frame's gyroscopic angular rate ω around about the x, y, and z axes (in radians per second), based on IMU data at time "t", is expressed in equation [7]:

$$s_{\omega,t} = \begin{bmatrix} 0 \\ \omega_x \\ \omega_y \\ \omega_z \end{bmatrix}_t = \begin{bmatrix} 0 \\ \omega_1 \\ \omega_2 \\ \omega_3 \end{bmatrix}_t - \begin{bmatrix} 0 \\ b_x \\ b_y \\ b_z \end{bmatrix}_{t-1} \quad [7]$$

Referring back to FIG. 1, $\omega_1$ corresponds to roll 182 around the x axis, $\omega_2$ corresponds to pitch 184 around the y axis, and $w_3$ corresponds to yaw 186 around the z axis. Bias offset values $b_x$, $b_y$, and $b_z$ compensate for gyroscope bias, and are a result of bias tracking in the update stage from the previous iteration as will be described further below.

Applying the angular velocity, the quaternion derivative over time describing the predicted rate of change $_E^s\dot{q}$ of orientation of the Earth reference frame relative to the sensor frame is expressed in equation [8]:

$$_E^s\dot{q}_{\omega,t} = \frac{1}{2} {}_E^s\hat{q} \otimes s_\omega \quad [8]$$

The "s" denotes the device's body frame and the "E" denotes Earth reference frame. The tilde "~" over the "s" indicates that the body frame is a prediction. The "ω" in the subscript of the derivative indicates it is based on the gyroscope angular rate.

The orientation of the sensor frame relative to the Earth reference frame at time t is expressed by a quaternion $_s^E\hat{q}_{\omega,t}$, which can be computed by numerically integrating the quaternion derivative $_E^s\dot{q}_{\omega,t}$ as described below by equations [9] and [10], provided that initial conditions are known. In these equations, $s_{\omega_t}$ is the angular rate (from equation [7]) described at time t, Δt is the sampling rate at which gyroscope data from the IMU is updated, and $_E^s\hat{q}_{est,t-1}$ a the previous updated "a posteriori" estimate of the orientation as output from the update stage of the prior iteration of the recursive algorithm. The subscript ω again indicates that the quaternion is calculated from angular rates:

$$_E^s\dot{q}_{\omega,t} = \frac{1}{2} {}_E^s\hat{q}_{est,t-1} \otimes s_{\omega_t} \quad [9]$$

The previous "a posteriori" orientation estimate summed with the derivative of equation [9] multiplied by the intervening amount of time since the last observation/iteration produces a prediction (a priori) of estimated frame orientation:

$$_E^s\hat{q}_{\omega,t} = {}_E^s\hat{q}_{est,t-1} + {}_E^s\dot{q}_{\omega,t} \cdot \Delta t \quad [10]$$

These equations provide a foundation for the dynamic model used by the prediction stage of the Kalman filter to form an estimate of the system's "state," based on the physical laws of motion and multiple sequential measurements from the IMU sensors. However, these equations are non-linear, whereas a Kalman filter is a linear system. Therefore, while the equations correctly describe the physical system, additional steps are required to make them compatible with a Kalman filter.

Conventionally, this is accomplished using a Jacobian. A Jacobian is a matrix of all first-order partial derivatives of a vector-valued function. Calculation a Jacobian is a computationally complex operation, and subtleties of the non-linear data can be lost, since the partial derivatives (which convey change over time) are not well-suited to handling non-linearities such as discontinuous data (e.g., rotation changing near-instantaneously from one direction to another).

A Jacobian-free linear equivalent expression is derived for state propagation by adapting the non-linear angular rate ${}_E^s\hat{q}_{\omega,t}$ derivation from equation [9] into a system propagation matrix "A." To derive a Jacobian-free linear equivalent expression for state propagation, the derivative quaternion (dq/dt) may be expressed as:

$$\frac{dq}{dt} = \frac{1}{2}\begin{bmatrix} 0 \\ \omega_x \\ \omega_y \\ \omega_z \end{bmatrix} \otimes {}_E^s\hat{q}_{est,t-1} \quad [11]$$

where the angular rate parameters $\omega_x$, $\omega_y$, and $\omega_z$ are in units of radians per second and ${}_E^s\hat{q}_{est,t-1}$ is the updated "a posteriori" estimate of orientation from the previous iteration of the algorithm.

In order to serve as a system propagation matrix "A," the quaternion ${}_E^s\hat{q}_{\omega,t}$ equation [10] is reformulated in linear form. This is in-part accomplished by substituting the matrix "Ω" in equation [12] for the quaternion cross product ${}_E^s\hat{q}_{\omega,t}$:

$$\Omega = \begin{bmatrix} 0 & -\omega_x & -\omega_y & -\omega_z \\ \omega_x & 0 & \omega_z & -\omega_y \\ \omega_y & -\omega_z & 0 & \omega_x \\ \omega_z & \omega_y & -\omega_x & 0 \end{bmatrix} \quad [12]$$

The system propagation matrix "A" in linear form reduces to:

$$A = \left(I + \frac{1}{2}\Omega \cdot \Delta t\right) \quad [13]$$

where I is the four-by-four identity matrix:

$$I = \begin{bmatrix} 1 & 0 & 0 & 0 \\ 0 & 1 & 0 & 0 \\ 0 & 0 & 1 & 0 \\ 0 & 0 & 0 & 1 \end{bmatrix} \quad [14]$$

and Δt is the sampling rate at which data is acquired from the IMU, which ordinarily corresponds to the difference between the current time "t" and the time "t−1" of the previous iteration. The system propagation matrix "A" is based on a linear dynamical system assumption, where the underlying system model comprises a propagation component and an observational component. The matrix "A" represents the propagation component, and can be characterized as "a linear dynamical system propagation model."

Combining the system propagation matrix "A" with the conjugate of the previous updated "a posteriori" estimate of orientation ${}_E^s\hat{q}_{est,t-1}$, the predicted "a priori" orientation estimate of the prediction stage of the Kalman filter becomes:

$${}_s^E\hat{q}_{\omega,t|t-1} = A * {}_E^s\hat{q}_{est,t-1}^* \quad [15]$$

where the notation "t|t−1" indicates that the prediction represents an estimate at time "t" given observations back to and including time "t−1." The predicted "a priori" orientation estimate corresponds to what the orientation should be if relying on the gyroscopes.

Using the system propagation matrix, the predicted "a priori" covariance estimate from the prediction stage becomes:

$$\tilde{P}_{t|t-1} = A * COV_{q,t-1} * A^T \quad [16]$$

where the tilde "~" denotes that the covariance is a prediction and $COV_{q,t-1}$ is an updated "a posteriori" covariance matrix $COV_{q,t}$ (described further below) from a previous iteration. The superscript "T" denotes a transpose of the matrix. A transpose is a matrix operation that rotates an m×n matrix to be an n×m matrix. If there are the same number of rows and columns, the result is that the diagonal flips around a diagonal.

In conventional Kalman filter notation, the "a posteriori" covariance matrix is sometimes denoted as $P_{t|t}$, which is not used here in an effort to better distinguish the "a priori" covariance of the current iteration from the "a posteriori" covariance from the previous iteration, since the "a posteriori" covariance from the previous iteration would be $P_{t-1|t-1}$.

Next presented is how the improved algorithm maps the accelerometer-derived sensor observation to a quaternion. Whereas the relative orientation of frames may be expressed as quaternions (e.g., body frame relative to Earth reference frame or vice-versa), the x, y, and z axis data from accelerometer used to verify the predicted orientation is expressed in vectors. As expressed in equation [5], a three-dimensional vector can be rotated by a quaternion. However, the well-defined but mostly non-linear mechanics from one quaternion state to another makes application of standard Kalman filter algorithms to fuse accelerometer data with gyroscope data difficult in a straight-forward linear formulation. Among other problems, turning measured accelerometer vector values into a quaternion "observation matrix" compatible with a Kalman filter is a computationally-critical pre-processing step, but one with inherent pitfalls due to the system's non-linear mechanics.

A shortcoming of conventional sensor fusion approaches is an inability to provide a clean, direct expression that maps the accelerometer data into something comparable with a quaternion that expresses a predicted frame-orientation based on gyroscope data. One approach has been to linearize the accelerometer data, or to calculate a Jacobian every iteration. Calculating a Jacobian to map the accelerometer data to a quaternion every iteration is computationally undesirable, as the derivative slope (corresponding to the rate of change in the data) may change with every iteration, requiring that the Jacobian matrix be completely recalculated.

The filter of device 100 maps the accelerometer-derived sensor observation to a quaternion using an axis-angle representation and a cross-product operations. An axis-angle representation of a rotation parameterizes a rotation in a three-dimensional Euclidean space by two values: a unit vector ê indicating the direction of an axis of rotation, and an angle θ describing the magnitude of the rotation about the axis. The mapping solution simplifies the observational dynamics through use of an "identity matrix" (i.e., a matrix with values of one along a diagonal, otherwise filled with zeros), and avoids the use of Jacobians.

Measured raw data from the three-axes accelerometer can be represented as:

$$s_a = \begin{bmatrix} 0 \\ a_x \\ a_y \\ a_z \end{bmatrix} \quad [17]$$

Figure 5:
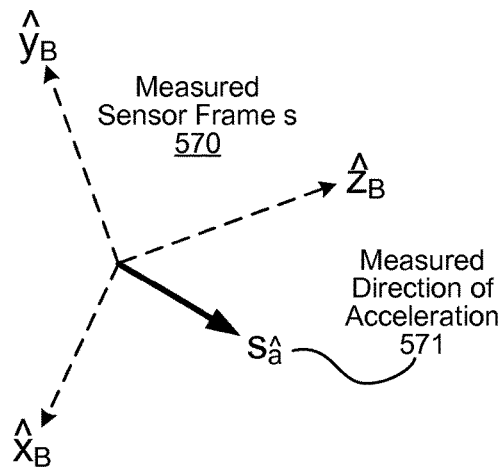
FIG. 5 illustrates an example of an attitude vector in a predicted sensor frame orientation.

The unit vector for the accelerometer data is:

$$s_{\hat{a}} = \frac{s_a}{\|s_a\|} \quad [18]$$

where $\|s_a\|$ is the norm (i.e., magnitude) of the measured raw accelerometer data. The unit vector $s_{\hat{a}}$, conveys the measured direction of acceleration, and is illustrated in FIG. 5 as unit vector 571 in a measured sensor frame 570. The axes $\hat{x}_B$, $\hat{y}_B$, and $\hat{z}_B$ of the measured sensor frame 570 correspond to the orientation of the device relative to the measured direction of acceleration 571.

A gravity unit vector may be defined as:

$$E_{\hat{g}} = \begin{bmatrix} 0 \\ 0 \\ 0 \\ 1 \end{bmatrix} \quad [19]$$

Based on this notation, the z axis is pointing down to the ground in the fixed Earth reference frame.

Figure 6:
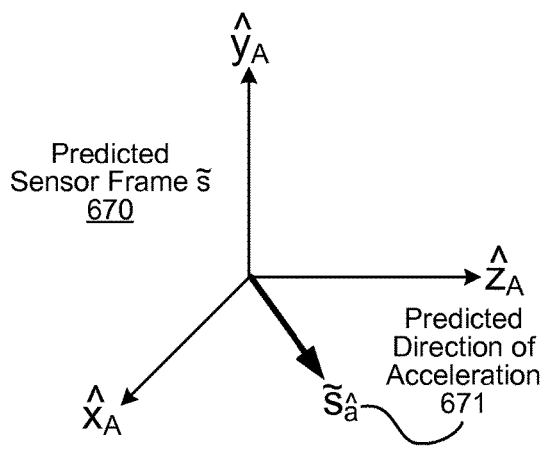
FIG. 6 illustrates an example of the attitude vector in a sensor-measured frame orientation.

The model's predicted accelerometer data $s_{\hat{a}}$ ("predicted" noted by the tilde "~") is based on the device's body frame, where the quaternion ${}_E^s\hat{q}_a$ describes the orientation of Earth reference frame relative to the predicted sensor/body frame. The subscript "a" denotes that the quaternion is based on accelerometer data. The predicted direction of acceleration is illustrated in FIG. 6 by a unit vector 671 relative to sensor/body frame 670. Axes $\hat{x}_A$, $\hat{y}_A$, and $\hat{z}_A$ correspond to the predicted orientation of the device based on updated "a posteriori" orientation estimate from the previous iteration.

Based on equation [5], the predicted accelerometer x, y, and z axis data can be calculated as:

$$\tilde{s}_{\hat{a}} = {}_s^E\hat{q}_{est,t-1} \otimes E_{\hat{g}} \otimes {}_E^s\hat{q}_{est,t-1} \quad [20]$$

where predicted acceleration $\tilde{s}_{\hat{a}}$ is the model's expectation of what measured acceleration $s_{\hat{a}}$ should be given the "a posteriori" quaternion ${}_E^s\hat{q}_{est,t-1}$ that describes the orientation of Earth reference frame relative to sensor/body frame. The quaternion ${}_s^E\hat{q}_{est,t-1}$ a the conjugate of ${}_E^s\hat{q}_{est,t-1}$.

In accordance with equation [6], ${}_E^s\hat{q}_{est,t-1}$ is a matrix equal to $[q_1 \ q_2 \ q_3 \ q_4]^T$. Utilizing equations [2], [4], [6], [19] and [20], the predicted accelerometer data $\tilde{s}_{\hat{a}}$ reduces to:

$$\tilde{s}_{\hat{a}} = \begin{bmatrix} 0 \\ 2(q_2 q_4 - q_1 q_3) \\ 2(q_1 q_2 + q_3 q_4) \\ q_1^2 - q_2^2 - q_3^2 + q_4^2 \end{bmatrix} \quad [21]$$

Having determined the predicted acceleration $\tilde{s}_{\hat{a}}$ and measured acceleration $s_{\hat{a}}$, a cross product $\tilde{s}_{\hat{a}} \times s_{\hat{a}}$ provides an indicator of the difference between the predicted and measured acceleration (i.e., the "error gap"):

$$e_a = \tilde{s}_{\hat{a}} \times s_{\hat{a}} \quad [22]$$

The cross product $e_a$ (771 in FIG. 7) is zero if prediction and measured reality are the same. If not zero, the resulting cross product $e_a$ (771) may be used to determine how the predicted quaternion ${}_E^s\hat{q}_a$ (representing the orientation of the predicted sensor frame 670 relative to the sensor/body frame 570) should be adjusted based on the accelerometer's measured result.

Figure 7:
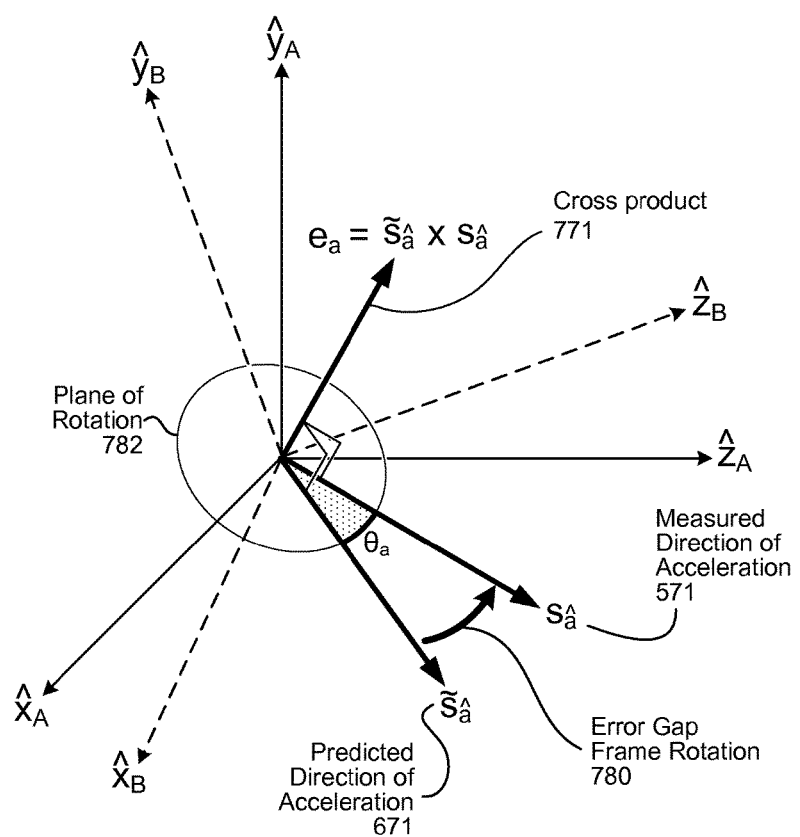
FIG. 7 illustrates the correction made to the predicted frame.

Specifically, the cross-product vector $e_a$ is used to correct the quaternion ${}_E^s\hat{q}_a$ based on the acceleration measurement by rotating the predicted sensor frame $\tilde{s}$ 670 by an angle $\theta_a$ (in radians) around the vector $e_a$, as illustrated in FIG. 7. Specifically, the measured accelerometer data contributes to the improved orientation filter's correction of frame orientation by rotating the predicted $\tilde{s}$ frame 670 described by the quaternion ${}_E^s\hat{q}_a$ by the angle $\theta_a$ around the cross product axis vector 771 corresponding to the "error gap" 780 between the predicted and measured vectors. The result is the predicted sensor frame 670 (axes $\hat{x}_A$, $\hat{y}_A$, and $\hat{z}_A$) rotates around the "error gap" vector $e_a$ 771 in the plane of rotation 782 by the angle $\theta_a$, as the predicted direction of acceleration 671 is realigned with the measured direction of acceleration 571. This axis rotation may be translated as the quaternion ${}_s^{\tilde{s}}\hat{q}_a$, which describes the orientation of the measured frame s (570) relative to the predicted frame $\tilde{s}$ (670).

This error gap rotation 780 does not necessarily result in the predicted sensor frame 670 (axes $\hat{x}_A$, $\hat{y}_A$, and $\hat{z}_A$) aligning exactly with the measured sensor frame 570 (axes $\hat{x}_B$, $\hat{y}_B$, and $\hat{z}_B$), since in addition to incorrectly predicting the direction of acceleration (i.e., vector 671), one or both of the sensor frames 570/670 may be inaccurate. However, over multiple iterations, the predicted sensor frame 570 and the measured sensor frame 670 will converge.

The angle $\theta_a$, may be approximated based on the area of the parallelogram formed by the predicted and measured acceleration vectors. Since the predicted and measured acceleration vectors are unit vectors with a magnitude of one, one-half the area of the parallelogram is approximately equal to the area of a sector of a circle formed by angle $\theta_a$. This approximation is expressed in equation [23]:

$$\frac{|\tilde{s}_{\hat{a}} \times s_{\hat{a}}|}{2} \approx \frac{1}{2} \theta_a r^2 = \frac{1}{2} \theta_a \rightarrow \theta_a \approx |\tilde{s}_{\hat{a}} \times s_{\hat{a}}| = \|e_a\| \quad [23]$$

Thus, the angle $\theta_a$ (in radians) can be approximated as equal to the normalized magnitude of the cross product $e_a$ vector. The direction of the cross product $e_a$ (771) may be expressed as a unit vector $e_{\hat{a}}$ determined according to equation [24]:

$$e_{\hat{a}} = \frac{e_a}{\|e_a\|} \qquad [24]$$

The x, y, and z components of the cross product unit vector $e_a$ are defined as $e_x$, $e_y$, and $e_z$. To correct the error gap, the quaternion ${}_{\tilde{s}}^{s}q_a$ describes a rotation of the estimated orientation relative to the measured orientation the axis formed by the cross product vector $e_a$ (771) by the angle $\theta_a$, which is expressed as:

$${}_{\tilde{s}}^{s}\hat{q}_{a,t} = {}_{\tilde{s}}^{s}\hat{q}_{a,t}^{*} = \begin{bmatrix} \cos\left(\frac{\theta_a}{2}\right) \\ -e_x \sin\left(\frac{\theta_a}{2}\right) \\ -e_y \sin\left(\frac{\theta_a}{2}\right) \\ -e_z \sin\left(\frac{\theta_a}{2}\right) \end{bmatrix} \qquad [25]$$

This quaternion applies the measured "observation" acceleration data to the "a posteriori" orientation, with the a posteriori orientation providing the foundation for the predicted frame $\tilde{s}$ (equations [20] and [21]), expressing the rotation of predicted sensor frame (670) and measured sensor frame s (570) cross-product vector $e_a$ (771) in FIG. 7.

The "observation" in quaternion form may be derived by taking the quaternion product of the "a priori" propagation result from equation [15] and the observation-based frame rotation from equation [25]:

$${}_{E}^{\tilde{s}}\hat{q}_{Observation} = {}_{\tilde{s}}^{E}\hat{q}_{\omega,t|t-1}^{*} \otimes {}_{\tilde{s}}^{s}\hat{q}_{a,t} \qquad [26]$$

which describes how Earth reference frame looks from the corrected sensor frame. This observation merges the orientation prediction relying on the gyroscopes with the data from the accelerometer.

This calculation of the "observation" frame represented by the result in equation [26] avoids the calculation in pure body frame which needs to be translated non-linearly. Moreover, this processing eliminates the non-linear observation matrix, without utilizing a Jacobian. In addition, no calibration is required to tune a proportional-integral-derivative (PID) controller to establish PID constants as is done in some Jacobian-based systems, as the improved orientation filter is able to make the needed corrections to fuse accelerometer data without constants and calibration by virtue of the frame rotation realignment around the cross product $e_a$ by the angle $\theta_a$.

In the update stage of a conventional algorithm, a matrix inversion is calculated to determine the Kalman gain $K_t$. Computationally, this inversion operation is the most "expensive" component of a Kalman filter. The gain formulation used corresponds to a determination of:

$$K_t = (\tilde{P}_{t|t-1} + R)^{-1} = (R + \tilde{P}_{t|t-1})^{-1} \qquad [27]$$

where $\tilde{P}_{t|t-1}$ is the projected "a priori" error covariance (a non-sparse matrix resulting from equation [16]) and R is a diagonal four-by-four variance matrix corresponding to variance of the IMU's accelerometer. Variance is an estimate of the accelerometer's instability due to random noise processes, separate from instability due to systematic errors and external effects such as temperature. Inverting the diagonal matrix R is computationally simple, but inverting the sum of the "a priori" error covariance $\tilde{P}_{t|t-1}$ plus accelerometer variance matrix R is not.

The modified Kalman filter in the device 100 may utilize a mathematical proof published by Kenneth S. Miller in an article entitled "On the Inverse of the Sum of Matrices" in the March 1981 issue of "Mathematics Magazine" to simplify computation, which is incorporated herein by reference: "If G and H are arbitrary nonsingular square matrices of the same dimensions, then the inverse of their product GH is well known to be $H^{-1}G^{-1}$. If G and G+H are nonsingular, then the problem of finding a simple expression for the inverse of G+H, say in terms of $G^{-1}$, is more difficult. This is the problem we wish to address. In the theorem below we shall establish a recursive form for $(G+H)^{-1}$. The key result in proving this theorem is a fundamental Lemma which states that if H has a rank of one, then $$(G + H)^{-1} = G^{-1} - \frac{1}{g} G^{-1} H G^{-1} \qquad [28]$$

where g=trace($HG^{-1}$)." A "trace" of a matrix equals a sum of the diagonal elements of the matrix.

Combining equations [27] and [28], the Kalman gain $K_t$ becomes:

$$K_t = (R + \tilde{P}_{t|t-1})^{-1} = R - \frac{1}{\text{trace}(\tilde{P}_{t|t-1}/R)} * R^{-1} * \tilde{P}_{t|t-1} * R^{-1} \qquad [29]$$

The original proof requires that $\tilde{P}_{t|t-1}$ be of "rank" one, which is not actually the case, such that the proof in equation [28] should not work as used here. The "rank" of a matrix is the size of the largest collection of linearly independent rows or columns. A rank of one means that every row is linearly dependent, and every column is linearly dependent, which is not the case with the projected "a priori" error covariance $\tilde{P}_{t|t-1}$. However, experimental results for a range of angular rates show that the results of the proof in equation [28] are sufficiently accurate if the diagonal matrices for the accelerometer variance R and the covariance $\tilde{P}_{t|t-1}$ are relatively small.

As the accelerometers conventionally used in mobile devices exhibit relatively small variances, the value of R should not affect the accuracy of equation [29]. For example, during experimentation, the diagonal accelerometer variance matrix R was set to a fixed four-by-four diagonal of 0.2 as:

$$R = \begin{bmatrix} 0.2 & 0 & 0 & 0 \\ 0 & 0.2 & 0 & 0 \\ 0 & 0 & 0.2 & 0 \\ 0 & 0 & 0 & 0.2 \end{bmatrix} \qquad [30]$$

which are values consistent with actual accelerometer variances that are exhibited by accelerometers commonly found in contemporary mobile devices. The improvement in computational efficiency that results from using the proof (equation [28]) to simplify equation [27] into the approximation produced by equation [29] makes the improved Kalman filter derivation sufficiently efficient to operate on embedded platforms with rudimentary processing capabilities.

However, the initialization of the covariance matrix is an important factor as to whether the shortcut in equation [29] will work. In conventional Kalman filter designs, the covariance may be initialized to an arbitrary value. In comparison, if $\tilde{P}_{t|t-1}$ in equation [29] is initialized to a large value, the $K_t$ approximation in equation [29] becomes unstable and the resulting covariance values will also be recursively unstable. If however, the covariance initialization is small enough, the $K_t$ gain approximation in equation [29] remains valid and the filter remains stable over time. This can be intuitively understood by Lyapunov's concept of stability domain: a set of initial points that always produce stable output given that the recursive system is designed to suppress the points back to the equilibrium.

Experimentally, covariance initialization should use values larger than 0 and less than 0.02. Specifically, at startup (time zero), $\tilde{P}_{t|t-1}$ should be initialized with four-by-four diagonal matrix, where the diagonal values "m" are greater than zero and less than 0.02:

$$\tilde{P}_{t|t-1} = \begin{bmatrix} m & 0 & 0 & 0 \\ 0 & m & 0 & 0 \\ 0 & 0 & m & 0 \\ 0 & 0 & 0 & m \end{bmatrix} \text{ at } t = 0 \text{ where } 0 < m < 0.02 \quad [31]$$

Since this range is based on a normalized quaternion, the difference between zero and 0.02 corresponds to roughly 15~20 degrees of uncertainty in any rotation axis. This covariance initialization of $\tilde{P}_{t|t-1}$ is for a quaternion state at time t=0, not the real sensor variances such as R. Setting this initial covariance does not limit the algorithm with respect to sensor variances of from sensors with different levels of performance (e.g., setting $\tilde{P}_{t|t-1}$ is independent of R). Since the quaternion values used by the orientation filter are normalized to unit vectors, specifying a number for covariance initialization works for any combination of sensors.

This range for covariance initialization relates to the gain equation [29], rather than the conventional gain equation presented in equation [27]. If the conventional gain equation is used, arbitrary values may be used for covariance initialization.

Another aspect of the update stage of the improved algorithm is updating the covariance with a combination of traditional Kalman gain and residual magnitude. Traditional Kalman filters update the "a posteriori" covariance matrix $COV_{q,t}$ according to:

$$COV_{q,t} = \tilde{P}_{t|t-1} - K_t * \tilde{P}_{t|t-1} \quad [32]$$

where $K_t$ is the Kalman gain and $\tilde{P}_{t|t-1}$ is the predicted "a priori" covariance from equation [16]. This formulation, following Ricatti recursion, decays exponentially over time. This decay is a disadvantage for quaternion-based Kalman filters since regardless of the filter's accuracy, the Kalman gain automatically decays, making each accelerometer-based update weaker (lesser weight) than the previous iteration. In other words, the filter becomes "complacent," and needs a boost in the Kalman gain whenever an accuracy value of the filter falls below a threshold value.

As an improvement to reduce and/or eliminate decay over time, the orientation filter of the device 100 calculates the updated "a posteriori" covariance $COV_{q,t}$ based in part on the "residual" $\hat{y}_t$. The "residual" $\hat{y}_t$ may be determined based on the difference of the modified prediction stage "a priori" quaternion (equation [15]) and the conjugate of the accelerometer's observation in quaternion form (equation [26]), as expressed by:

$$\hat{y}_t = {}_s^E \hat{q}_{\omega,t|t-1} - {}_E^s \hat{q}_{Observation}* \quad [33]$$

Replacing equation [32], the improved update of "a posteriori" covariance $COV_{q,t}$ is calculated according to:

$$COV_{q,t} = \tilde{P}_{t|t-1} - K_t * \tilde{P}_{t|t-1} + c*(I*|\hat{y}_t|)*\tilde{P}_{t|t-1} \quad [34]$$

where $K_t$ is the Kalman gain (equation [27] or [29]), $\tilde{P}_{t|t-1}$ is the predicted "a priori" covariance (equation [16]), c is a constant, I is an identity matrix (equation [14]), and $\hat{y}_t$ is the "residual" (equation [33]). The constant c is a tunable parameter to keep covariance matrix $COV_{q,t}$ from expanding exponentially, and may be a number greater than zero up to ten (i.e., $0 < c \le 10$). The constant c is similar to the "P" constant in proportional-integral-derivative (PID) controllers and control schemes. The constant c may be tuned with relative ease since the quaternions are normalized and hence have an upper limit on residual magnitude. Multiplying the identity matrix I by the absolute values of the residual $\hat{y}_t$ results in a diagonal matrix. The result of equation [34] is a covariance matrix that actively tracks inaccuracies over time as the device 100 undergoes motions, and is used as $COV_{qt-1H}$ on the next iteration of the algorithm (e.g., equation [16]).

The estimated frame is updated based on the pre-processed observation in quaternion form (the result from the "a priori" prediction stage in equation [15]), subtracting the product of the Kalman gain (equation [27] or [29]) and the residual (equation [33]):

$$_s^E \hat{q}_{Kalman} = {}_s^E \hat{q}_{t|t-1} - K_t * \hat{y}_t \quad [35]$$

A conjugate of the updated frame divided by norm of the update frame's quaternion matrix becomes the updated "a posteriori" state estimate:

$$_E^s \hat{q}_{est,t} = \frac{_s^E \hat{q}_{Kalman}^*}{\|_s^E \hat{q}_{Kalman}\|} \quad [36]$$

The state estimate produced by equation [34] is the final "result" output by the Kalman filter, which on the next cycle, becomes the previous result a $_E^s \hat{q}_{est,t-1}$ (e.g., as used in equations [11], [15], [20]).

As a further improvement, the residual $\hat{y}_t$ (equation [33]) and covariance $COV_{q,t}$ (equation [34]) may be used to actively track sensor bias without prior bias information. Since the majority of sensor fusion error comes from incorrect gyroscope angular rates, most of the filter's residual (error) can be attributed to gyroscope bias. The diagonal elements of the updated "a posteriori" covariance $COV_{q,t}$ provide a magnitude of that error (i.e., how much uncertainty/inaccuracy is included in each quaternion). The combination of the updated a posteriori covariance with the residual results in an active gyroscope bias tracking without an increase in state space:

$$\begin{bmatrix} 0 \\ b_x \\ b_y \\ b_z \end{bmatrix}_t = \begin{bmatrix} 0 \\ b_x \\ b_y \\ b_z \end{bmatrix}_{t-1} + (COV_{q,t} * \hat{y}_t) \quad [37]$$

On the next iteration, the result of equation [37] is entered into equation [7] as $[0\ b_x\ b_y\ b_z]_{t-1}^T$, correcting bias in the angular rate ω. In comparison, conventional filters separately calculate bias states for each gyroscope, resulting in three extra states for gyroscope bias tracking, effectively inverting a seven-by-seven matrix rather than a four-by-four matrix.

On system start-up, since there are no updated values from a previous iteration on the first pass of the algorithm, an initial values may be based on unverifiable IMU readings (e.g., magnetometer, gravity) and/or default values (e.g., initializing the $_E^S\hat{q}_{est,t-1}$ and $COV_{q,t-1}$ matrices and gyroscope bias to zeros). A virtue of the improved process is that the accuracy of this initial prediction vector is not critical, as the process will converge toward a stable and accurate prediction.

If the device 100 includes a magnetometer, the magnetometer calibration may be performed by applying a similar process to equations [17] to [26], substituting magnetometer data $m_x$, $m_y$, and $m_z$ for accelerometer data in equation and similarly substituting acceleration-based values with magnetometer based values (in essence, replacing the a's with b's). The resulting magnetometer's "observation" in quaternion form may then be used to apply a correction to the gyroscope rates $[0\ \omega_1\ \omega_2\ \omega_3]^T$ in a Mahony complementary filter style.

Figure 8:
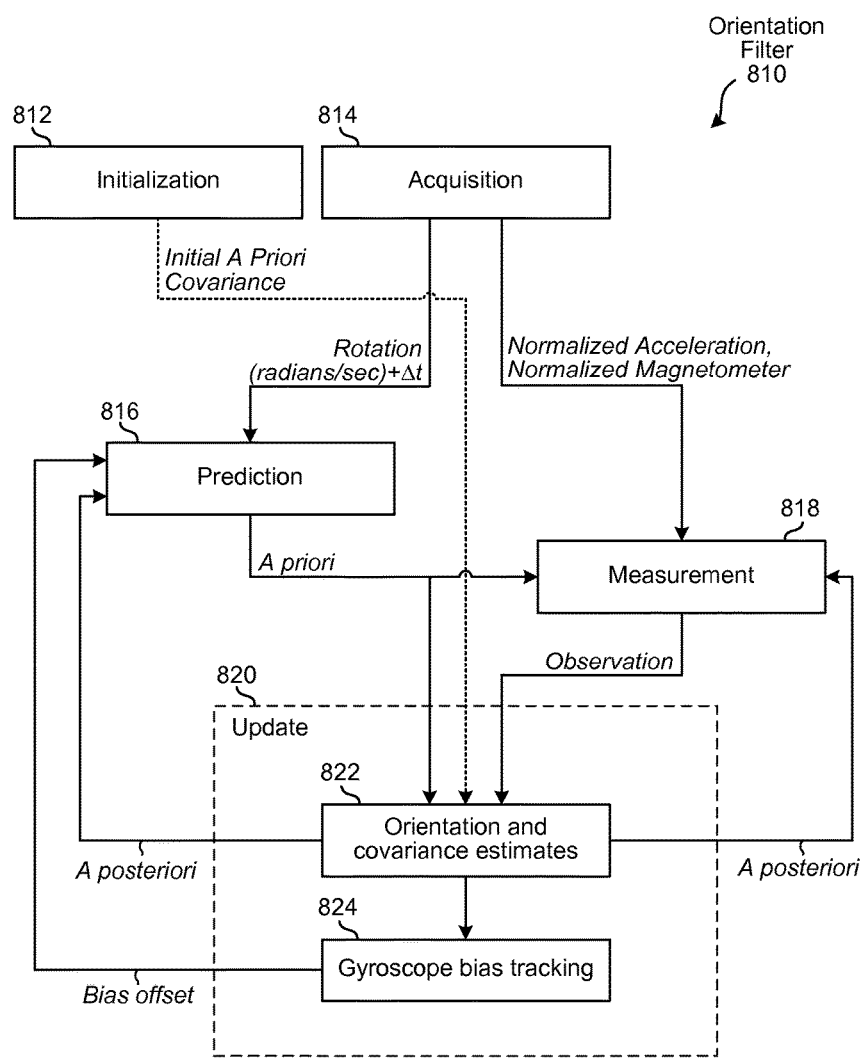
FIG. 8 illustrates an example block diagram conceptually illustrating components of the orientation filter of the device of the system of FIG. 1.

FIG. 8 is a block diagram overview of the orientation filter 810 of the device 100. An initialization block 812 performs the process of initializing values for the first pass of the algorithm after system start-up. As noted above, an initial orientation value may be based on unverifiable IMU readings (e.g., magnetometer and direction of gravity) and/or default values (e.g., initializing the a posteriori orientation matrix with zeros). Other values such as the a priori error covariance the covariance $\tilde{P}_{t|t-1}$ is set to a particular range values (see equation [31]), whereas gyroscope bias may be initialized to a default value such as initializing with zeros. The dotted line from the initialization block 812 to the orientation and covariance estimates block 822 is included to emphasize the importance of initializing the a priori covariance in accordance with equation [31] if using equation [29] (instead of equation [27]) to determine the Kalman gain, but values for other blocks may also be initialized by the initialization block 822. Since the vectors and quaternions used by the orientation filter 810 are normalized, such initialization produces consistent results on different devices with different statistical characteristics.

An acquisition block 814 acquires data from the IMU, including gyroscope, accelerometer, and magnetometer data, performing the step (122) of determining changes in acceleration and rotation in FIG. 1. The sampling rate corresponds to Δt. The acquisition block 814 converts the raw gyroscope data into angular rate data in units of radians per second ($\omega_1$, $\omega_2$, and $\omega_3$ in equation [7]). The acquision block 814 receives the raw three-axis acceleration data ($a_x$, $a_y$, and $a_z$ in equation [17]) and outputs the normalized acceleration data ($s_{\hat{a}}$ in equation [18]). Similarly, the acquisition block receives raw three-axis magnetometer data and outputs normalized magnetic field data.

A prediction block 816 performs the step (124) of predicting orientation as a linear equivalent expression based on a change in rotation and the previous update of the "a posteriori" orientation estimate from the previous iteration. The prediction block 816 also determines the a priori adjusts the gyroscope data using the bias offset, and calculates the "a priori" covariance based on a previous update of the "a posteriori" covariance estimate and the linear equivalent expression.

A measurement block 818 performs the step (126) of determining an observational orientation based on an angle between a measured direction of acceleration and an expected direction of acceleration.

An update block 820 comprises two parts. A first update block 822 performs the step of updating (128) the orientation estimate using the predicted orientation from the prediction block 816 and the observational orientation from the measurement block 818, resulting in the "a posteriori" orientation estimate. The first update block 822 also determines the "a posteriori" covariance. A second update block 824 performs the step (130) of updating the gyroscope bias tracking.

Figure 9:
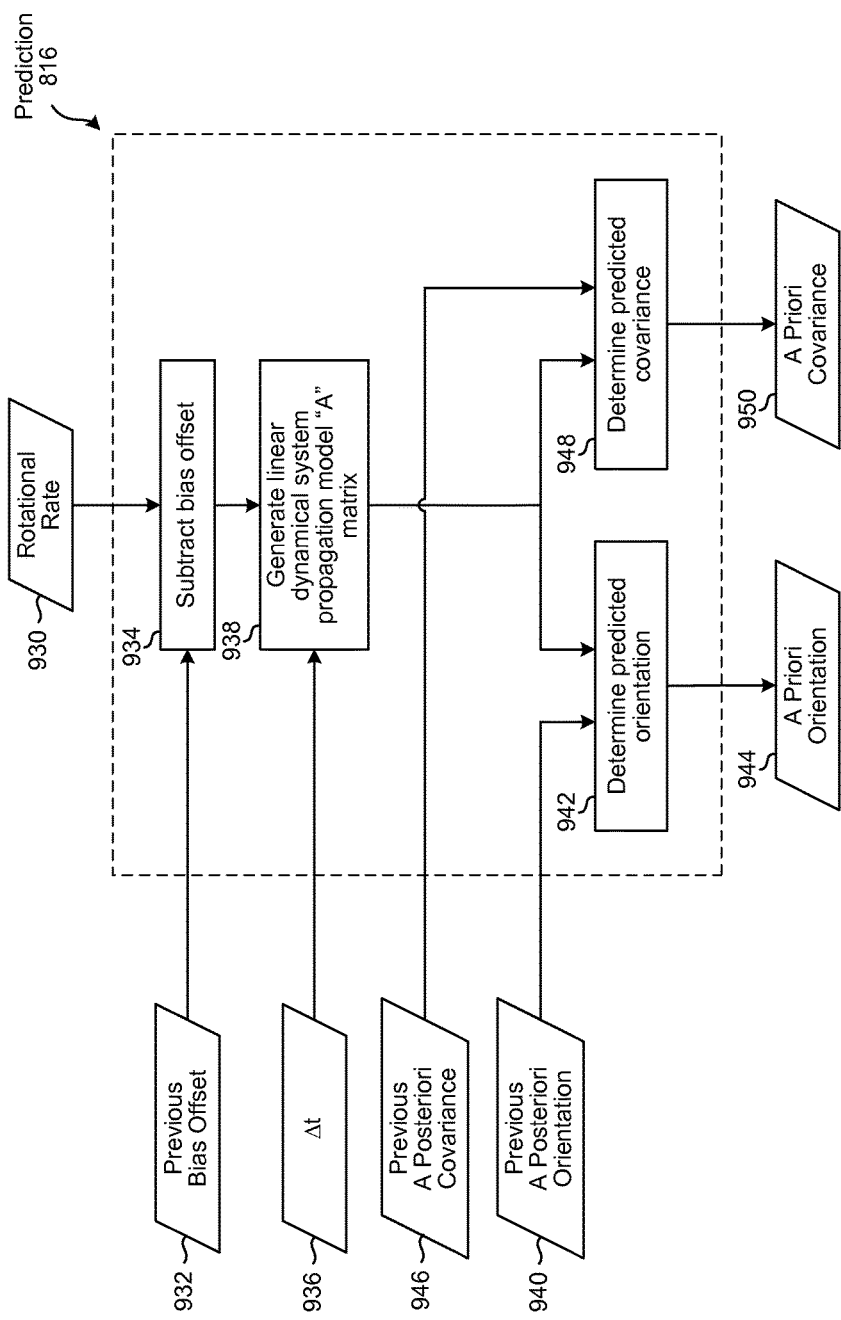
FIGS. 9 to 11 illustrate portions of process flows performed by several of the components of the orientation filter.
Figure 10:
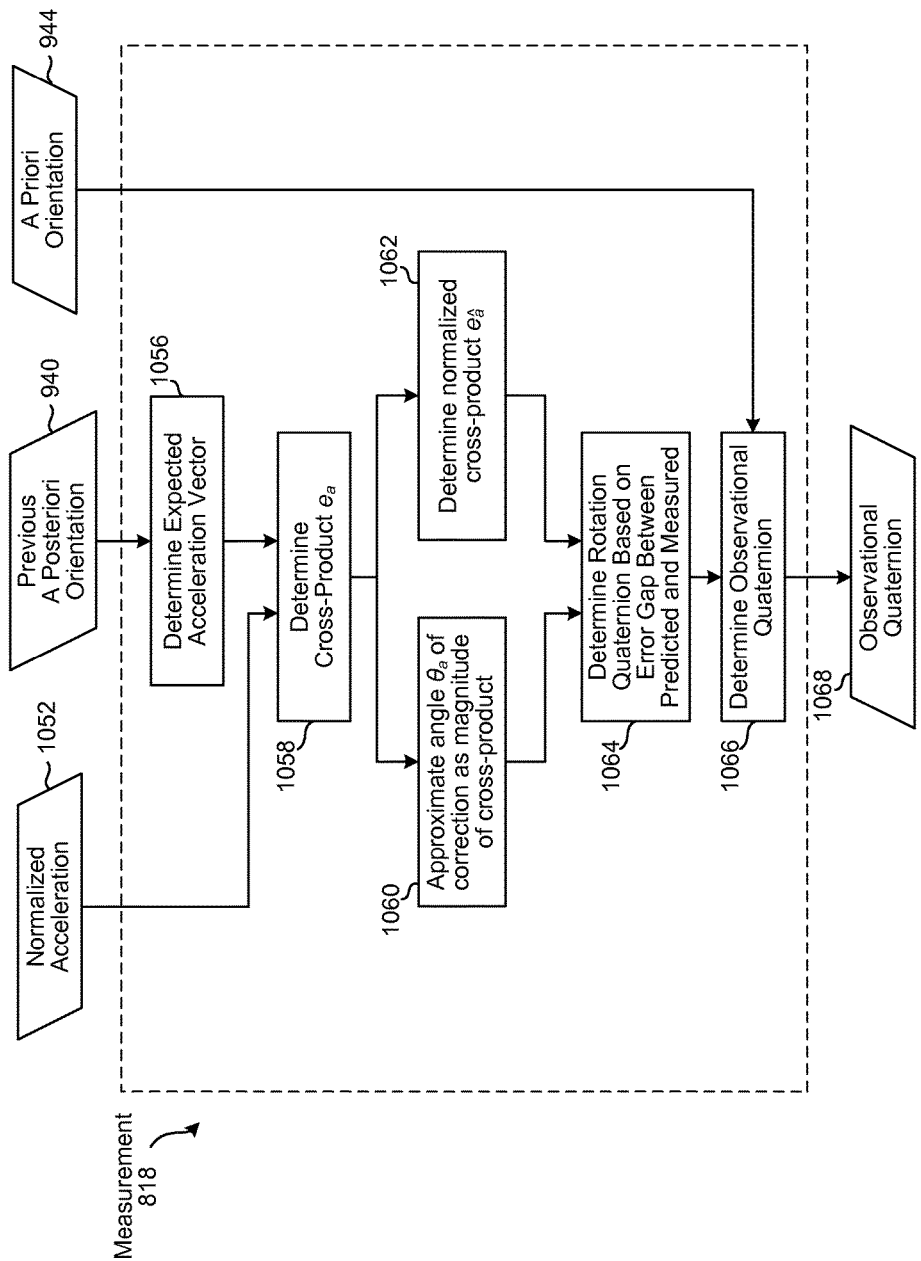
Figure 11:
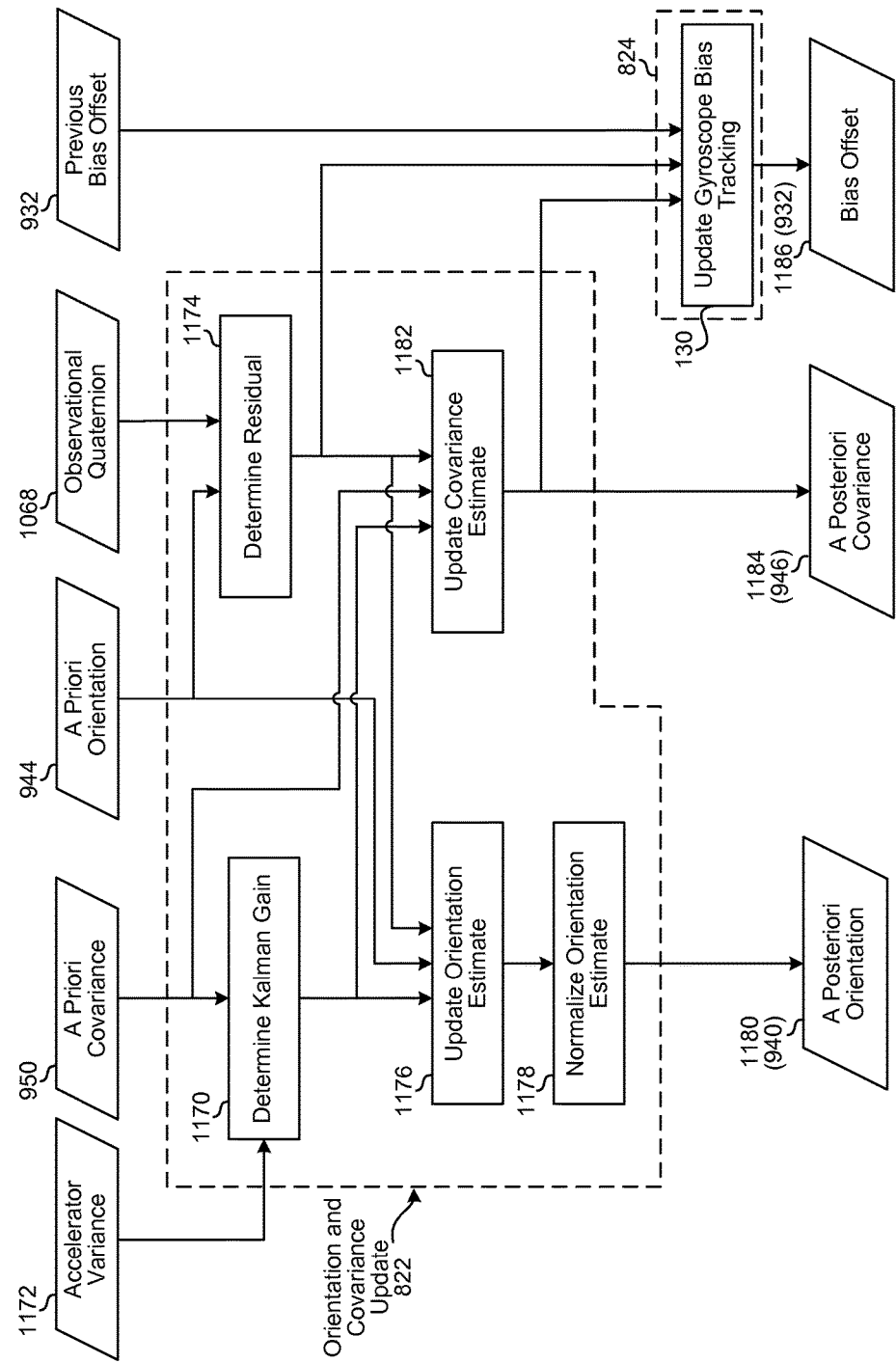

FIGS. 9-11 provide additional details about the operation of the prediction block 816, the measurement block 818, and the update block 820. In the discussion of these figures, reference will be made back to the relevant equation or equations that may be used to perform the described operations. On the first pass of the algorithm, as noted above, the "previous" iteration data (e.g., "a posteriori" orientation and covariance, and bias offset) may come from the initialization block 812, as discussed for example with equation [31].

Referring to the prediction block 816 in FIG. 9, the gyroscope's rotational rate data 930 provided by the acquisition gyroscope is adjusted for bias. A bias offset 932 from the previous iteration is subtracted 934 from the rotational rate data 930, as described in equation [7]. A system propagation matrix "A" is generated (938) in linear form based on the bias-adjusted rotational rate and the acquisition sampling rate Δt (936), as described in equations [12] and [13]. The predicted "a priori" orientation estimate 944 is determined (942) based on the system propagation matrix "A" and the previous "a posteriori" orientation estimate 940, as described in equation [15]. The predicted "a priori" covariance estimate 950 is determined (948) based on the system propagation matrix "A" and the previous "a posteriori" covariance estimate 946, as described in equation [16].

Referring to the measurement block 818 in FIG. 10, the measured acceleration data 1052 from the acquisition engine 814 is normalized (1054), as described in equation [18]. Based on the previous "a posteriori" orientation estimate 940, an expected acceleration vector is determined (1056), as described in equation [21]. A cross-product $e_a$ (771) of the normalized measured acceleration vector 571 and the expected acceleration vector 671 is determined (1058), as described in equation [22]. An approximation is made (1060) of the angle $\theta_a$ between the measured and expected vectors, which is the angle for the frame rotation 780 to correct the "error gap" between the vectors, as described in equation [23]. The cross product $e_a$ (771) is also normalized (1062), resulting in a unit vector $e_{\hat{a}}$, as described in equation [24]. An orientation correction quaternion is determined (1064) describing the estimated orientation relative to the measured orientation, rotated around the axis formed by the cross product vector $e_a$ (771) by the angle $\theta_a$, as described in equation [25]. The accelerometer's "observational" orientation quaternion (1068) is determined (1066), based on the predicted "a priori" orientation estimate (944) and the orientation correction quaternion, reflecting how the Earth reference frame looks from the corrected sensor frame, as described in equation [26].

Referring to the orientation and covariance update block 822 in FIG. 11, the Kalman gain $K_t$ may be determined (1170) based on the accelerator variance "R" 1172 and the "a priori" covariance 950 from the prediction block, as described in equation [29]. The accelerator variance R 1172 may be stored within the device 100, and/or may be calculated by the IMU or the orientation filter 810 using a conventional accelerator variance determination technique, such as an M-sample variance. The variance may be determined, for example, at the time the accelerometer is manufactured, at the time the device 100 is manufactured, or during "dead time" when device 100 is stationary and inactive. Determining variance R at the time of manufacture is preferred, since the environment can be precisely controlled (e.g., assuring the device is stationary and not subject to vibration). The variance R is a static constant that once determined, does not ordinarily need to be measured again. Block 1170 uses equation [29] to determine the Kalman gain $K_t$ as a replacement for the conventional gain equation [27], significantly reducing the computational cost of the gain calculation.

The residual $\hat{y}_t$ is determined (1174) based on the "a priori" orientation 944 and the observational orientation 1068 from the measurement block 818, as described in equation [33]. Based on the Kalman gain $K_t$, the "a priori" orientation 944, and the residual $\hat{y}_t$, an updated orientation estimate is determined (1176) relative to Earth reference frame, as described in equation [35]. A conjugate of the updated orientation estimate is determined, to make the estimate relative to the device's body frame, and the conjugate is normalized (1178), as described in equation [36]. The normalized updated orientation estimate is the "a posteriori" orientation estimate 1180, and may be output to the device's user's interface and/or software applications. On the next iteration of the algorithm, the "a posteriori" orientation estimate 1180 becomes the previous "a posteriori" orientation estimate 940.

Based on the Kalman gain $K_t$, the "a priori" covariance 950, and the residual $\hat{y}_t$, an updated covariance estimate is determined (1182), as described in equation [34]. The tunable parameter constant "c" (not illustrated) may be stored within the device 100. The updated covariance estimate is the "a posteriori" covariance estimate 1184. On the next iteration of the algorithm, the "a posteriori" covariance estimate 1184 becomes the previous "a posteriori" covariance estimate 946.

The gyroscope bias tracking block 824 updates (130, as in FIG. 1) gyroscope bias tracking based on the previous bias offset 932, the "a posteriori" covariance 1184, and the residual $\hat{y}_t$, as described in equation [37]. On the next iteration of the algorithm, the updated bias offset 1186 becomes the previous bias offset 932.

FIG. 12 is a block diagram conceptually illustrating example components of the device 100. In operation, the device 100 may include computer-readable and computer-executable instructions that reside on the device 100, as will be discussed further below.

The device 100 may include, among other things a video input device such as camera(s) 1214, and a video output device for displaying images, such as display 1216. The video output device may be a display of any suitable technology, such as a liquid crystal display, an organic light emitting diode display, electronic paper, an electrochromic display, or other suitable component(s).

The device 100 may include an address/data bus 1224 for conveying data among components of the device 100. Each component within the device 100 may also be directly connected to other components in addition to (or instead of) being connected to other components across the bus 1224.

The device 100 may include one or more controllers/processors 1204, that may each include a central processing unit (CPU) for processing data and computer-readable instructions, and a memory 1206 for storing data and instructions. The memory 1206 may include volatile random access memory (RAM), non-volatile read only memory (ROM), non-volatile magnetoresistive (MRAM) and/or other types of memory. The device 100 may also include a data storage component 1208, for storing data and controller/processor-executable instructions (e.g., instructions to perform the algorithms and operations illustrated and described in connection with FIGS. 1 and 8-11, including the associated equations presented above). The data storage component 1208 may include one or more non-volatile storage types such as magnetic storage, optical storage, solid-state storage, etc. The device 100 may also be connected to removable or external non-volatile memory and/or storage (such as a removable memory card, memory key drive, networked storage, etc.) through the input/output device interfaces 1202.

Computer instructions for operating the device 100 and its various components may be executed by the controller(s)/processor(s) 1204, using the memory 1206 as temporary "working" storage at runtime. The computer instructions may be stored in a non-transitory manner in non-volatile memory 1206, storage 1208, or an external device. Alternatively, some or all of the executable instructions may be embedded in hardware or firmware in addition to or instead of software.

The device 100 includes input/output device interfaces 1202. A variety of components may be connected through the input/output device interfaces 1202, such as the camera(s) 1214 and the display 1216. The input/output device interfaces 1202 may also include an interface for an external peripheral device connection such as universal serial bus (USB), FireWire, Thunderbolt or other connection protocol. The input/output device interfaces 1202 may also include a connection to one or more networks 1299 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, etc.

The device 100 further includes an IMU 1260 that includes at least a three-axes accelerometer 1262, a three-axes gyroscope 1264, and a three-axes magnetometer 1166. As noted above, the IMU 1260 may also comprise a dedicated three-axis gravity sensor (not illustrated) dedicated to determining the measured direction of gravity. The thermal sensor and/or an air-pressure sensor (not illustrated) may be included to compensate for temperature-based and atmospheric pressure-based variations that may influence the data from other IMU components.

The orientation filter 810 performs the equation calculations disclosed above, receiving sensor data from the IMU 1260, etc., and outputting periodically updated data conveying the orientation of the device 100. The orientation filter 810 updates the orientation as described in connections with FIGS. 1 and 8-11 based on data from the gyroscopes 1264 and the accelerometers 1262 (and in some implementations, from the magnetometers 1266) in accordance with the disclosed equations.

The device 100 may also include a user tracking system, such as a head tracking system, or other camera or visual based tracking system (not illustrated) that may be used to determine orientation of the device 100 relative to items detected by the camera(s) 1214. Orientation data determined by a camera-based tracking system may be combined with or processed in a similar manner to the IMU data discussed above to assist the device 100 in processing motion and/or changes in orientation.

The concepts disclosed herein may be applied within a number of different devices and computer systems, including, for example, remote controls, "smart" phones, laptop computers, personal digital assistants (PDAs), tablet computers, wearable computing devices (watches, glasses, etc.), other mobile devices, etc.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of mobile computers, orientation filters, and inertial navigation systems should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk and/or other media. In addition, portions of the orientation filter 810 may be implemented in hardware, such arithmetic logic to apply the various vector matrix transforms.

As used in this disclosure, the term "a" or "one" may include one or more items unless specifically stated otherwise. Further, the phrase "based on" is intended to mean "based at least in part on" unless specifically stated otherwise.

What is claimed is:

1. A computing device comprising:
   at least one processor;
   a gyroscope;
   an accelerometer; and
   at least one memory including instructions that, when executed by the at least one processor, cause the device to:
   determine a linear approximation of a measured rotation of the device based on first data from the gyroscope;
   determine a predicted covariance based on the linear approximation and a previous covariance;
   determine a measurement residual quantifying a discrepancy between a predicted orientation of the computing device based on the first data and a frame rotation that rotates the predicted orientation based on second data from the accelerometer;
   determine a covariance of a Kalman filter based on the predicted covariance, the measurement residual, and a gain of the Kalman filter; and
   determine an estimate of an orientation of the computing device relative to an Earth reference frame based at least in part on the covariance of the Kalman filter.

2. The computing device of claim 1, wherein the at least one memory further includes instructions that, when executed by the at least one processor, further cause the device to:
   determine a bias offset for the gyroscope based on the covariance and the measurement residual,
   wherein the linear approximation on a next determination of the estimate of the orientation is based on a combination of the first data from the gyroscope and the bias offset.

3. The computing device of claim 1, wherein the at least one memory further includes instructions that, when executed by the at least one processor, further cause the device to:
   determine the gain of the Kalman filter in accordance with:

$$K_t = R - \frac{1}{\text{trace}(\tilde{P}_{t|t-1}/R)} * R^{-1} * \tilde{P}_{t|t-1} * R^{-1}$$

wherein $K_t$ is the gain, $\tilde{P}_{t|t-1}$ is the predicted covariance, and R is a first diagonal four-by-four matrix with diagonal values corresponding to a variance of the accelerometer.

4. The computing device of claim 3, wherein the at least one memory further includes instructions that, when executed by the at least one processor, further cause the device to:
   initialize the predicted covariance $\tilde{P}_{t|t-1}$ on a first determination of the estimate of the orientation to a second diagonal four-by-four matrix with diagonal values "m," wherein 0<m<0.02.

5. The computing device of claim 1, wherein the instructions determine the linear approximation in accordance with:

$$A = \left( I + \frac{1}{2} \begin{bmatrix} 0 & -\omega_x & -\omega_y & -\omega_z \\ \omega_x & 0 & \omega_z & -\omega_y \\ \omega_y & -\omega_z & 0 & \omega_x \\ \omega_z & \omega_y & -\omega_x & 0 \end{bmatrix} \right) \cdot \Delta t$$

wherein A is the linear approximation, $\Delta t$ is a sampling rate at which the first data is acquired from the gyroscope, $\omega_x$, $\omega_y$, and $\omega_z$ are angular rate parameters based on the first data from the gyroscope, and I is a diagonal four-by-four matrix with diagonal values of one.

6. The computing device of claim 1, wherein the at least one memory further includes instructions that, when executed by the at least one processor, further cause the device to:
   determine the predicted orientation of the device based on the linear approximation and a previous orientation estimate of the device;
   determine an angle corresponding to a difference between a predicted direction of gravity in a predicted frame of the device and a measured direction of gravity, wherein the predicted direction of gravity is based on the previous orientation estimate of the device and wherein the measured direction of gravity is based on the second data from the accelerometer;
   determine a cross product of a predictive unit vector corresponding to the predicted direction of gravity and a measured gravity unit vector corresponding to the measured direction of gravity, the cross product resulting in a cross-product vector that is perpendicular to both the predicted direction of gravity and the measured direction of gravity;

determine a rotation quaternion representing a rotation of the predicted frame of the device based on the angle; and determine the frame rotation by combining the predicted orientation and the rotation quaternion.

7. The computing device of claim 6, wherein the instructions to determine the angle approximate the angle based on the cross product.

8. The computing device of claim 1, wherein the instructions determine the measurement residual "$\hat{y}_t$" in accordance with:

$$\hat{y}_t = {}_S^E\hat{q}_{\omega,t|t-1} - {}_E^S\hat{q}^*_{Observation}$$

wherein ${}_S^E\hat{q}_{\omega,t|t-1}$ is the predicted orientation of the computing device and ${}_E^S\hat{q}_{Observation}$ is the frame rotation, and wherein the instructions determine the covariance "$COV_{q,t}$" in accordance with:

$$COV_{q,t} = \tilde{P}_{t|t-1} - K_t * \tilde{P}_{t|t-1} + c*(I*|\hat{y}_t|)*\tilde{P}_{t|t-1}$$

wherein $K_t$ is the gain of the Kalman filter, $\tilde{P}_{t|t-1}$ is the predicted covariance, I is a diagonal four-by-four matrix with diagonal values of one, and c is a constant that is greater than zero and less-than-or-equal-to ten.

9. A method comprising:
determining a linear approximation of a measured rotation of a computing device comprising a gyroscope and an accelerometer based on first data from the gyroscope;
determining a predicted covariance based on the linear approximation and a previous covariance;
determining a measurement residual quantifying a discrepancy between a predicted orientation of the computing device based on the first data and a frame rotation that rotates the predicted orientation based on second data from the accelerometer;
determining a covariance of a Kalman filter based on the predicted covariance, the measurement residual, and a gain of the Kalman filter; and
determining an estimate of an orientation of the computing device relative to an Earth reference frame based at least in part on the covariance of the Kalman filter.

10. The method of claim 8, further comprising:
determining a bias offset for the gyroscope based on the covariance and the measurement residual,
wherein the linear approximation on a next determination of the estimate of the orientation is based on a combination of the first data from the gyroscope and the bias offset.

11. The method of claim 9, further comprising:
determining the gain of the Kalman filter in accordance with:

$$K_t = R - \frac{1}{\text{trace}(\tilde{P}_{t|t-1}/R)} * R^{-1} * \tilde{P}_{t|t-1} * R^{-1}$$

wherein $K_t$ is the gain, $\tilde{P}_{t|t-1}$ is the predicted covariance, and R is a first diagonal four-by-four matrix with diagonal values corresponding to a variance of the accelerometer.

12. The method of claim 11, further comprising:
initializing the predicted covariance $\tilde{P}_{t|t-1}$ on a first determination of the estimate of the orientation to a second diagonal four-by-four matrix with diagonal values "m," wherein 0<m<0.02.

13. The method of claim 9, wherein determining the linear approximation of the measured rotation of the device based on the first data from the gyroscope comprises determining the linear approximation in accordance with:

$$A = \left(I + \frac{1}{2}\begin{bmatrix} 0 & -\omega_x & -\omega_y & -\omega_z \\ \omega_x & 0 & \omega_z & -\omega_y \\ \omega_y & -\omega_z & 0 & \omega_x \\ \omega_z & \omega_y & -\omega_x & 0 \end{bmatrix}\right) \cdot \Delta t$$

wherein A is the linear approximation, $\Delta t$ is a sampling rate at which the first data is acquired from the gyroscope, $\omega_x$, $\omega_y$, and $\omega_z$ are angular rate parameters based on the first data from the gyroscope, and I is a diagonal four-by-four matrix with diagonal values of one.

14. The method of claim 9, further comprising:
determining the predicted orientation of the device based on the linear approximation and a previous orientation estimate of the device;
determining an angle corresponding to a difference between a predicted direction of gravity in a predicted frame of the device and a measured direction of gravity, wherein the predicted direction of gravity is based on the previous orientation estimate of the device and wherein the measured direction of gravity is based on the second data from the accelerometer;
determining a cross product of a predictive unit vector corresponding to the predicted direction of gravity and a measured gravity unit vector corresponding to the measured direction of gravity, the cross product resulting in a cross-product vector that is perpendicular to both the predicted direction of gravity and the measured direction of gravity;
determining a rotation quaternion representing a rotation of the predicted frame of the device based on the angle; and
determining the frame rotation by combining the predicted orientation and the rotation quaternion.

15. The method of claim 14, wherein determining the angle comprises approximating the angle based on the cross product.

16. The method of claim 9, wherein determining the measurement residual "$\hat{y}_t$" is in accordance with:

$$\hat{y}_t = {}_S^E\hat{q}_{\omega,t|t-1} - {}_E^S\hat{q}^*_{Observation}$$

wherein ${}_S^E\hat{q}_{\omega,t|t-1}$ is the predicted orientation of the computing device and ${}_E^S\hat{q}_{Observation}$ is the frame rotation, and wherein determining the covariance "$COV_{q,t}$" is in accordance with:

$$COV_{q,t} = \tilde{P}_{t|t-1} - K_t * \tilde{P}_{t|t-1} + c*(I*|\hat{y}_t|)*\tilde{P}_{t|t-1}$$

wherein $K_t$ is the gain of the Kalman filter, $\tilde{P}_{t|t-1}$ is the predicted covariance, I is a diagonal four-by-four matrix with diagonal values of one, and c is a constant that is greater than zero and less-than-or-equal-to ten.

17. The computing device of claim 1, wherein the at least one memory further includes instructions that, when executed by the at least one processor, further cause the device to:
- update a user interface of the computing device based at least in part on the estimate of the orientation of the computing device.

18. The method of claim 9, further comprising:
- updating a user interface of the computing device based at least in part on the estimate of the orientation of the computing device.

19. A method comprising:
- determining a linear approximation of a measured rotation of a computing device comprising a gyroscope and an accelerometer based on first data from the gyroscope;
- determining a predicted covariance based on the linear approximation and a previous covariance;
- determining a measurement residual quantifying a discrepancy between a predicted orientation of the computing device based on the first data and a frame rotation that rotates the predicted orientation based on second data from the accelerometer;
- determining a covariance of an orientation filter based on the predicted covariance, the measurement residual, and a gain of the orientation filter;
- determining an estimate of an orientation of the computing device relative to an Earth reference frame based at least in part on the covariance of the orientation filter; and
- updating a user interface of the computing device based at least in part on the estimate of the orientation of the computing device.

* * * * *